(12) United States Patent
Cavallerano et al.

(10) Patent No.: US 6,226,384 B1
(45) Date of Patent: *May 1, 2001

(54) METHOD AND DEVICE FOR PROVIDING CONTROLLED ACCESS VIDEO SIGNALS WITHOUT PROVIDING A SIGNAL IN THE CLEAR

(75) Inventors: Alan Cavallerano, White Plains; Carlo Basile, Ossining; Jill Forer Goldenberg, New Rochelle, all of NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/768,479

(22) Filed: Dec. 18, 1996

(51) Int. Cl.$^7$ .............................. H04N 7/167; H04N 1/44
(52) U.S. Cl. ............................. 380/214; 380/245
(58) Field of Search ................................ 380/10, 14, 214, 380/245

(56) References Cited

U.S. PATENT DOCUMENTS

| | | | |
|---|---|---|---|
| 2,619,530 | * 11/1952 | Roschke . | |
| 2,847,768 | * 8/1958 | Bridges . | |
| 3,466,385 | * 9/1969 | Hendrickson . | |
| 3,689,688 | * 9/1972 | Shanahan et al. . | |
| 5,079,544 | * 1/1992 | Demond et al. | 340/701 |
| 5,208,857 | * 5/1993 | LeBrat | 380/14 |
| 5,216,713 | * 6/1993 | Lindholm | 380/7 |
| 5,321,748 | 6/1994 | Zeidler et al. | 380/14 |
| 5,533,127 | * 7/1996 | Luther | 380/28 |
| 5,636,279 | * 6/1997 | Katta et al. | 380/20 |

* cited by examiner

Primary Examiner—Stephen C. Buczinski
(74) Attorney, Agent, or Firm—Laurie F. Gathman

(57) ABSTRACT

A display device for receiving encrypted or scramble video data and for decrypting or descrambling the video data such that a signal is not provided "in the clear". The video data is stored in a memory array in an encrypted form and read out from the memory array using a decryption key. The encrypted data is then read out from the memory elements in accordance with known methods.

14 Claims, 13 Drawing Sheets

FIG. 6

| 1 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 2 | 0 | 0 | 0 | 0 | 0 | 0 | 0 | 0 | 0 | 0 | 0 | 0 | 0 | 0 |
| 0 | 0 | 3 | 0 | 0 | 0 | 0 | 0 | 0 | 0 | 0 | 0 | 0 | 0 | 0 | 0 |
| 0 | 0 | 0 | 4 | 0 | 0 | 0 | 0 | 0 | 0 | 0 | 0 | 0 | 0 | 0 | 0 |
| 0 | 0 | 0 | 0 | 5 | 0 | 0 | 0 | 0 | 0 | 0 | 0 | 0 | 0 | 0 | 0 |
| 0 | 0 | 0 | 0 | 0 | 6 | 0 | 0 | 0 | 0 | 0 | 0 | 0 | 0 | 0 | 0 |
| 0 | 0 | 0 | 0 | 0 | 0 | 7 | 0 | 0 | 0 | 0 | 0 | 0 | 0 | 0 | 0 |
| 0 | 0 | 0 | 0 | 0 | 0 | 0 | 8 | 0 | 0 | 0 | 0 | 0 | 0 | 0 | 0 |
| 0 | 0 | 0 | 0 | 0 | 0 | 0 | 0 | 9 | 0 | 0 | 0 | 0 | 0 | 0 | 0 |
| 0 | 0 | 0 | 0 | 0 | 0 | 0 | 0 | 0 | 10 | 0 | 0 | 0 | 0 | 0 | 0 |
| 0 | 0 | 0 | 0 | 0 | 0 | 0 | 0 | 0 | 0 | 11 | 0 | 0 | 0 | 0 | 0 |
| 0 | 0 | 0 | 0 | 0 | 0 | 0 | 0 | 0 | 0 | 0 | 12 | 0 | 0 | 0 | 0 |
| 0 | 0 | 0 | 0 | 0 | 0 | 0 | 0 | 0 | 0 | 0 | 0 | 13 | 0 | 0 | 0 |
| 0 | 0 | 0 | 0 | 0 | 0 | 0 | 0 | 0 | 0 | 0 | 0 | 0 | 14 | 0 | 0 |
| 0 | 0 | 0 | 0 | 0 | 0 | 0 | 0 | 0 | 0 | 0 | 0 | 0 | 0 | 15 | 0 |
| 0 | 0 | 0 | 0 | 0 | 0 | 0 | 0 | 0 | 0 | 0 | 0 | 0 | 0 | 0 | 16 |

| PIXEL LOCATION ||  PIXEL VALUE |
|---|---|---|
| LINE (ROW) | COLUMN | |
| 2 | 0 | 0 |
| 2 | 1 | 2 |
| 2 | 2 | 0 |
| 2 | 3 | 0 |
| 2 | 4 | 0 |
| 2 | 5 | 0 |
| 2 | 6 | 0 |
| 2 | 7 | 0 |
| 2 | 8 | 0 |
| 2 | 9 | 0 |
| 2 | 10 | 0 |
| 2 | 11 | 0 |
| 2 | 12 | 0 |
| 2 | 13 | 0 |
| 2 | 14 | 15 |
| 2 | 15 | 0 |
| 6 | 0 | 0 |
| 6 | 1 | 0 |
| 6 | 2 | 0 |
| 6 | 3 | 0 |
| 6 | 4 | 0 |
| 6 | 5 | 0 |
| 6 | 6 | 0 |
| 6 | 7 | 0 |
| 6 | 8 | 0 |
| 6 | 9 | 0 |
| 6 | 10 | 11 |
| 6 | 11 | 0 |
| 6 | 12 | 0 |
| 6 | 13 | 0 |
| 6 | 14 | 0 |
| 6 | 15 | 0 |

FIG. 11

METHOD AND DEVICE FOR PROVIDING CONTROLLED ACCESS VIDEO SIGNALS WITHOUT PROVIDING A SIGNAL IN THE CLEAR

CROSS REFERENCE TO RELATED APPLICATIONS

This is a continuation of application Ser. No. 08/768,479 filed Dec. 18, 1996.

BACKGROUND OF THE INVENTION

1. Field of the Invention

The invention relates in general to display devices and in particular to scrambling and encrypting devices and methods to prevent a signal "in the clear" at the display device.

2. Description of Related Art

To avoid pirating of video, video is scrambled or encrypted by the provider to protect against unauthorized viewing. The term "scrambling" typically means the altering of an analog signal such that it cannot be displayed in a conventional sense without the proper descrambling operation. Examples of scrambling techniques include, but are not limited to, sync suppression, active line rotation, and line shuffling. The term "encryption" typically is used to describe the operation of altering a digital sequence usually by multiplying it by a pseudo-random sequence. In order to recover the original signal, a "key" is required. An example of this technique is the Data Encryption Standard (DES).

An example of a typical MPEG display system without encryption is shown in FIG. 1. An example of a typical MPEG display system with encryption is shown in FIG. 2, where it should be noted that an encrypted sequence "BLCFADGIHEKJ" is created.

A video signal is often scrambled or encrypted so that without proper authorization, it is in an unusable form. However, if the consumer premises are granted authorization, then typically at interfaces which are accessible to the consumer, such as at the output of a cable converter box or the "video output" jacks of a receiver, the video signal is descrambled or decrypted and hence is "in the clear" (See FIG. 3).

There are many types of display devices available today. There is the generally well known cathode ray tube display devices (CRT), and discrete display devices such as digital light modulators or deformable mirror spatial light modulator (DMD), liquid crystal displays (LCD), and plasma displays. Each of these displays have the problems associated with an unauthorized user simply recording the video "in the clear" from the output of the cable converter box or the "video output" jacks of a television receiver. For ease of description however, reference will be had to the operation of a DMD.

A digital light modulating element is one which is capable of modulating incident light to two different luminance levels. In the simplest case, either a bright or a dark light level is produced. Typically the element is either light reflective or light transmissive. An advantage of this type of element is that it enables a display apparatus to be constructed which can be operated totally by the application of digital signals. This facilitates integration of the display and of associated digital drive circuitry on a chip.

A particular type of the spatial light modulator is the deformable-mirror device (DMD) which is described by Larry J. Hornbeck in "Deformable-Mirror Spatial Light Modulators", SPIE Vol. 1150, pages 86–102 (1990), (hereby incorporated by reference). The DMD incorporates, on an integrated circuit chip, a matrix array of individually-addressable, electrostatically-deflectable mirrors. Each mirror produces one light-modulated pixel of an image (e.g. figures, symbols or text) to be presented to a viewer.

U.S. Pat. No. 5,079,544, which is hereby incorporated by reference, describes in detail various display devices which utilize DMDs. Two of the drawing figures from that patent are included herein, in slightly modified form as FIGS. 4 and 5, to facilitate a general explanation of the operation of an exemplary DMD.

FIG. 4A is a diagram of a DMD integrated circuit chip including a timing circuit 14, an array 16 of deformable mirror cells, a register 18 (e.g. a shift register), and first and second decoders 22 and 24, respectively. The deformable mirror cells may be disposed in a matrix arrangement or in some other convenient arrangement. A typical arrangement is a row-and-column matrix where each cell is disposed at a crossing of a respective row and column conductor or line. This type of arrangement is presumed for purposes of describing and explaining the operation of the array 16. A memory cell, including a plurality of sub-cells for storing respective bits of a multi-bit display code, is associated with each mirror cell. The multi-bit display code enables different luminance levels to be achieved by varying the amount of time that the mirrors are ON or OFF. For a more detailed explanation of achieving the different luminance levels reference is made to U.S. Pat. No. 5,079,544 and U.S. Ser. No. 08/495,290.

The register 18 has a number of taps 20 for electrical connection to a bus (not shown) to enable data to be loaded into the register for transfer to respective memory cells in the array. The bus may provide data from a variety of different sources, such as an A/D converter driven by a video source (e.g. a television), a computer or a graphics system. The register 18 also has a number of outputs which are connected to respective column lines $C_1, C_2 \ldots C_N$ of the array 16. Similarly, the decoder 22 has a number of outputs which are connected to respective row lines $R_1, R_2 \ldots R_M$ of the array. Although not shown in FIG. 4A, the timing circuit 14 is electrically connected to the register 18 and to the decoders 22 and 24. The decoders themselves each include means, such as shift registers, for sequentially selecting the memory sub-cells in response to timing pulses from the timing circuit 14. In DMD devices the data can be loaded into the register sequentially to be read out sequentially. Thus if the signal is encrypted the decrypting must occur before the data is loaded into the register. This provides a signal "in the clear."

In response to timing signals produced by the timing circuit 14:

register 18 and decoder 22 sequentially select row and column lines to direct data from the register to the memory cells associated with selected mirror cells;

decoder 22 also sequentially selects the memory sub-cells into which data from the register 18 is to be written; and decoder 24 sequentially reads the data from the memory sub-cells to activate the associated mirror cells.

FIG. 5 shows schematically an arbitrary three-bit memory cell of the DMD array 16, electrically connected to row line $R_m$ and column line $C_n$. This figure also shows integrated circuitry associated with this memory cell, the mirror cell $DM_{mn}$ located at the crossing of row line $R_m$ and column line $C_n$, with which the memory cell is associated, and connections to the register 18 and to the decoders 22 and 24.

This and each other memory cell in the array is formed by three single-bit inverting memory sub-cells 54,55,56 for storing respective bits of a three-bit binary display code. The data to be written into this memory cell is provided over column line $C_n$ from a respective output of register 18 to three electrically connected data lines 50,51,52 which, in turn, are selectively connected to inputs of the sub-cells through WRITE switching transistors 96,97,98, respectively. Selection of these transistors is controlled via row line $R_m$ which is formed by a group of three row conductors that are electrically connected to gates of the transistors 96,97,98 via gating lines 92,91,90 respectively. Note that column line $C_n$ is electrically connected to the data lines 50,51,52 of every memory cell in column n. Similarly, row line $R_m$ is electrically connected to the gating lines 92,91,90 of every memory cell in row m.

Reading of the stored data from the memory sub-cells is controlled by the decoder 24 having three outputs which are electrically connected via gating lines 84,85,86 to respective gates of three READ switching transistors 68,69,70. Outputs of the memory sub-cells are selectively connected via these transistors to an input 72 of a single-bit inverting memory cell 74. Note that gating lines 84,85,86 are electrically connected to corresponding READ switching transistors for every memory cell in the array.

The single-bit inverting memory cell 74 has an output electrically connected to the associated mirror cell $DM_{mn}$. Specifically, the output of memory cell 74 is directly electrically connected to a control electrode 128 and is electrically connected through an inverter 129 to a control electrode 130. As is explained in detail in the SPIE article by Hornbeck and in U.S. Pat. No. 5,079,544, which have been incorporated by reference, when memory cell 74 produces a voltage representative of a logical ONE, this voltage effects deflection of reflective mirror element 116 to an ON position represented by the dashed line 118. Conversely, when memory cell 74 produces a voltage representative of a logical ZERO, this voltage effects deflection of reflective mirror element 116 to an OFF position represented by the dashed line 134. In the ON position, the mirror element 116 reflects light (from a source not shown in FIG. 5) and directs it toward a pixel at row m and column n on a display screen, which corresponds with the pixel represented by the memory cell. Conversely, in the OFF position, mirror element 116 directs the light away from the display screen. U.S. Ser. No. 08/495,290 (incorporated by reference) illustrates an example of how different luminance levels are achieved for each pixel while using the simple ON and OFF approach described above.

The pixel data are loaded into register and the addressable memory elements sequentially across each line, sequentially line-by-line, but all pixel elements for the entire display are modulated at the same time. This sequential loading, however, provides a signal "in the clear" which is easily pirated. There are similar signals "in the clear" for LCD devices, CRTs and plasma display devices.

SUMMARY OF THE INVENTION

It is an object of the invention to eliminate the signal "in the clear".

It is another object of the invention to eliminate the sign "in the clear" without requiring substantial modification of the display apparatus.

Achievement of these and other objects is based on the realization that to load the memory elements with pixel data it is not necessary to do so in a sequential order. Instead the memory elements are loaded in an encrypted sequence in accordance with an encryption "key". A register is initially loaded with an encrypted sequence of pixel data (e.g. the pixels of row 1 are not initially loaded into the register, but instead encrypted pixel data is loaded such as the pixel data for column 2, row 3, and then column 8 row 1, and then column 4 row 6 etc.). The memory elements then cannot be loaded in sequential order but instead are loaded in accordance with a decryption key that places the pixel data from the register into the correct memory element. For example, the memory elements corresponding to column 2, row 3, column 8, row 1 and column 4, row 6 are each loaded with the pixel data from the register. The pixel data is thus decrypted once loaded in the array of memory elements but this decrypted video data is only found in the display device itself and cannot be easily pirated.

Since the memory array is loaded with decrypted video data before a read operation is executed by the decoder, the encrypted writing of the array is transparent to the read operation and the read operation is performed in accordance with known methods.

These objects are also achieved in an analog display device by converting the scrambled analog signal into an encrypted digital sequence and storing the encrypted data in a memory. The data is then read from the memory in accordance with a decryption key and digital to analog converted for display. The data can also be decrypted as it is being written into the memory and read out in a sequential pixel-by-pixel, line-by-line basis.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention reference will be had to the following description taken in connection with the accompanying drawings, in which:

FIG. 4A is a diagram of a conventional deformable mirror while

FIG. 6 shows a discrete display device pixel matrix.

FIG. 7 shows the pixel data values of the discrete display device of FIG. 6.

FIG. 8 shows the encrypted contents of an array of memory elements of a discrete display device when decryption has not been performed.

FIG. 9 shows the decrypted contents of the array of memory elements of a discrete display device.

FIG. 11 shows a sample memory map of pixel locations and corresponding pixel values shown in FIG. 7.

DESCRIPTION OF THE PREFERRED EMBODIMENTS

Figure 1:
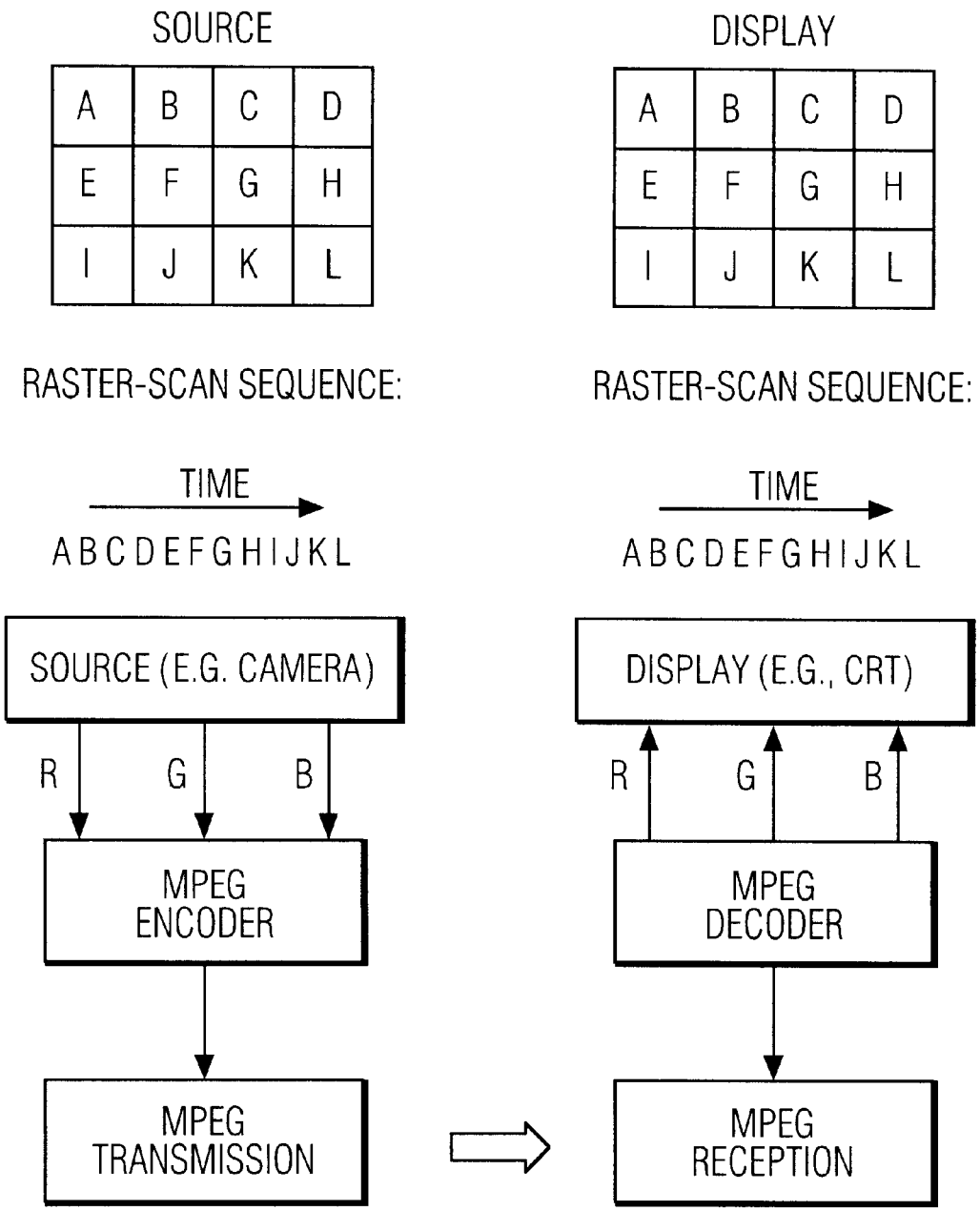
FIG. 1 shows a typical MPEG display system.
Figure 2:
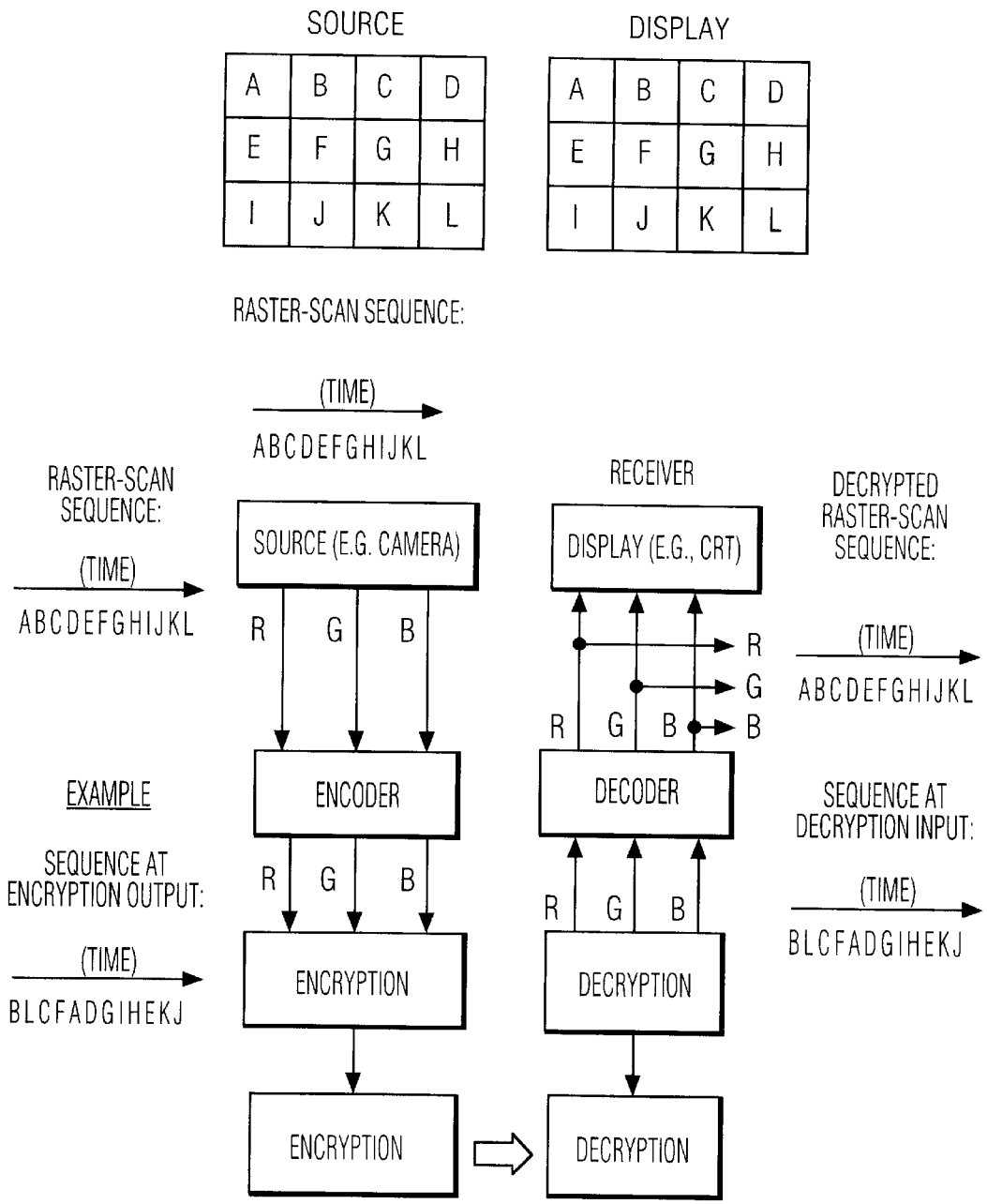
FIG. 2 shows a typical MPEG display system with encryption.
Figure 3:
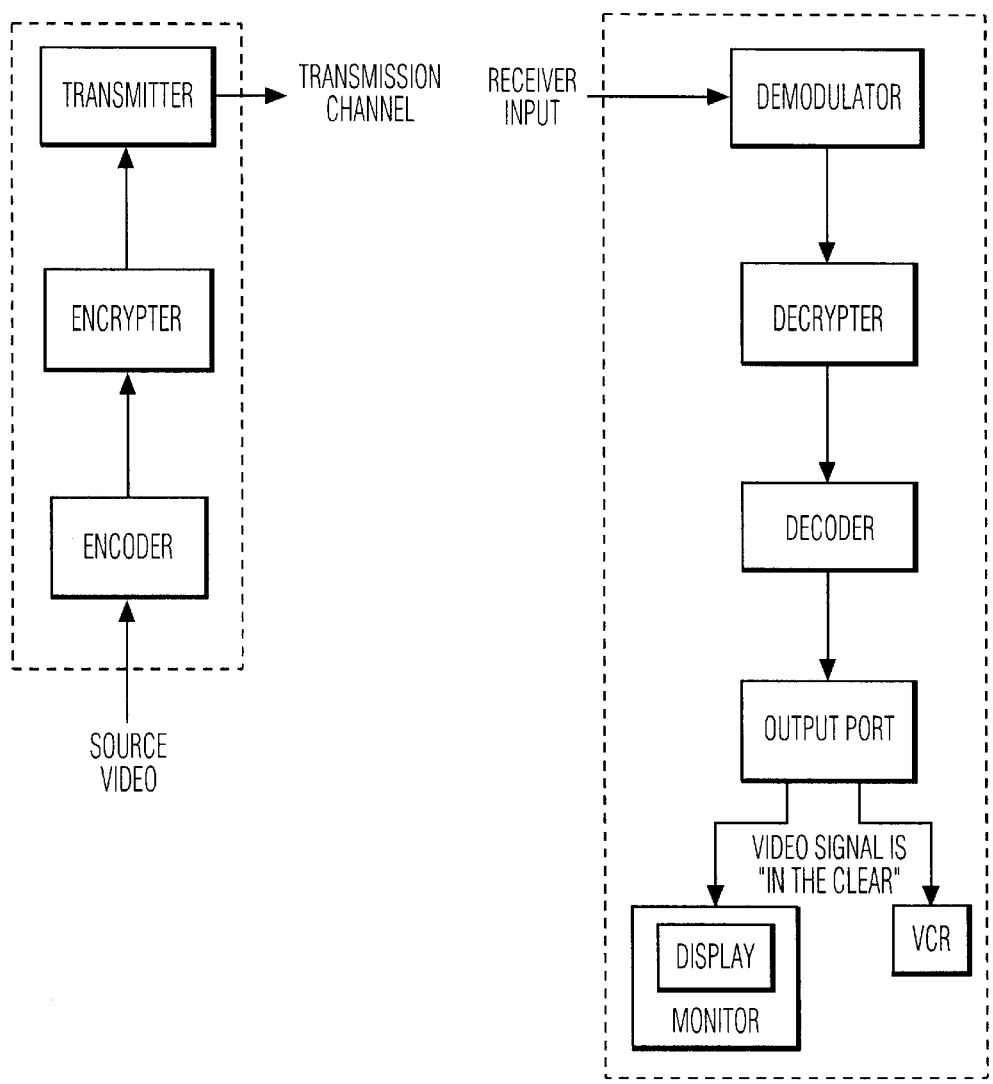
FIG. 3 shows the availability of a signal in the clear in a MPEG encryption scheme.
Figure 4A:
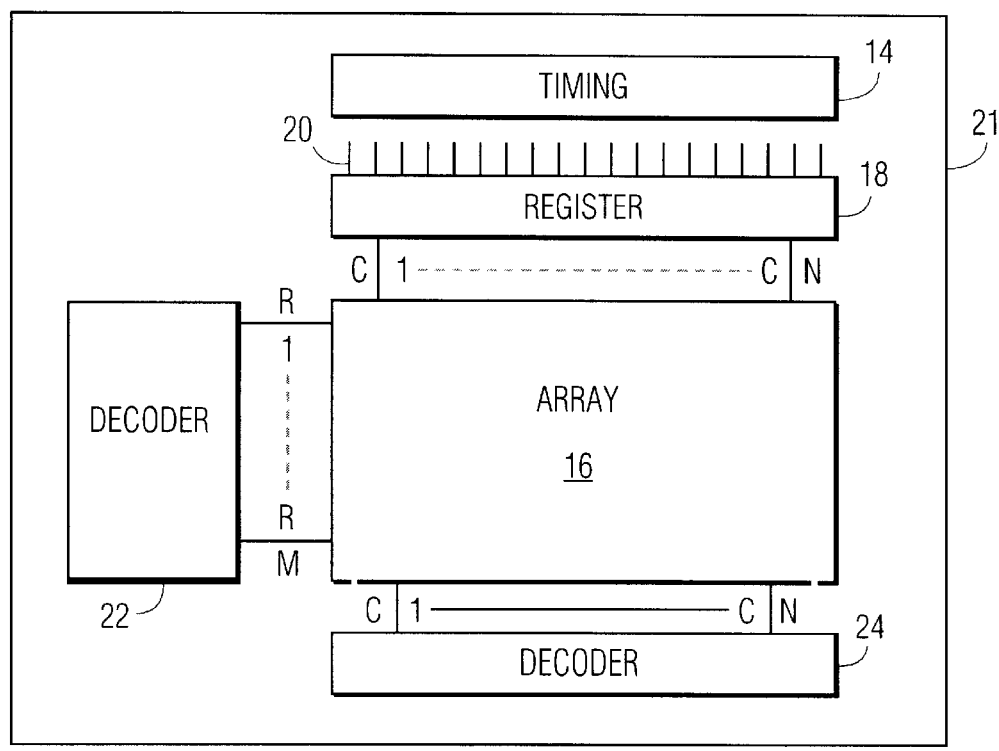

As explained above, the DMD embodiment shown in FIG. 4A stores pixel data in the pixel (column) register 18. In the prior art, the pixel register 18 contains a number of memory elements corresponding to the number of active pixels on any given active line (row). The pixel data for a given line (row) are transferred to the array 16, typically in line-sequential order, under control of the line (row) select decoder 22. The decoder 22 addresses the memory locations in the array 16 for the desired line. The pixel data stored in the pixel (column) register 18 are then transferred to array 16 line-by-line. Once the array 16 is fully loaded with a frame of pixel data the DMD can be activated. The activation of the DMD requires addressing the entire array on a bit-plane basis, under control of the bit plane decoder 24. For example, all of the most significant bits are addressed for a given time duration, followed by the subsequent bits. All of the timing for the system is under control of the timing generator 14. The loading of the array can be referred to as a "write" operation and the reading of the array corresponds to the bit-plane activation or "read" operation. The timing generator 14 provides the appropriate write and read enable signals.

Figure 4B:
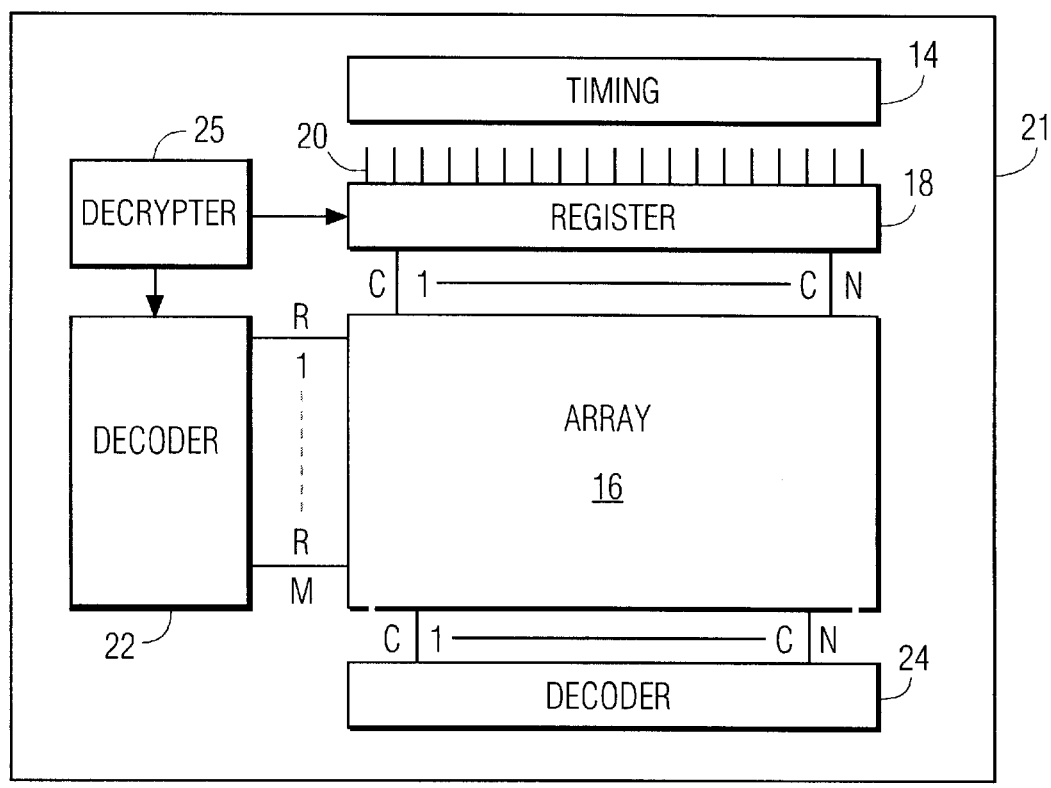
FIG. 4B is a diagram of a deformable mirror device in accordance with the invention.
Figure 5:
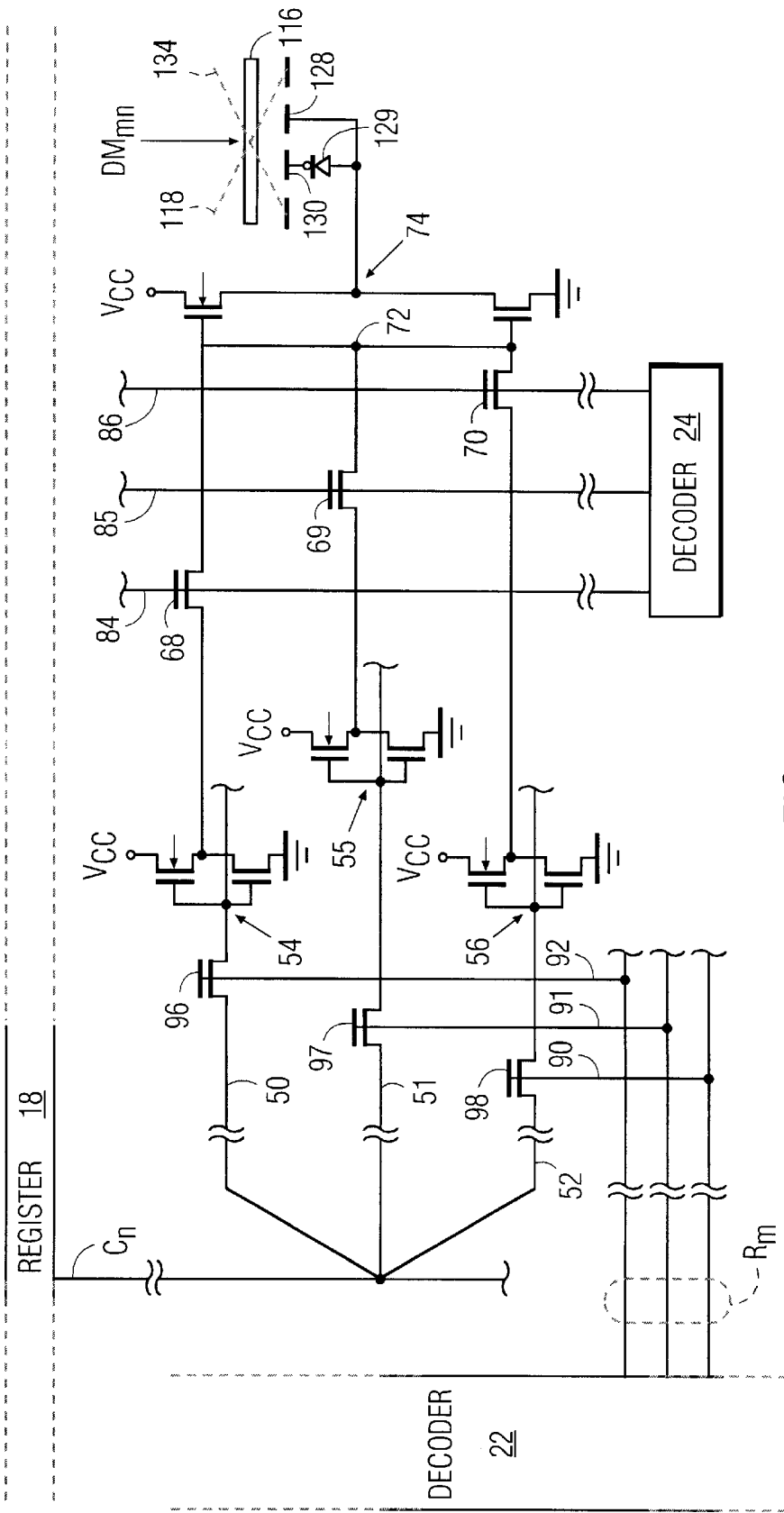
FIG. 5 is a schematic diagram of a single cell of the device of FIG. 4A.
Figure 9:
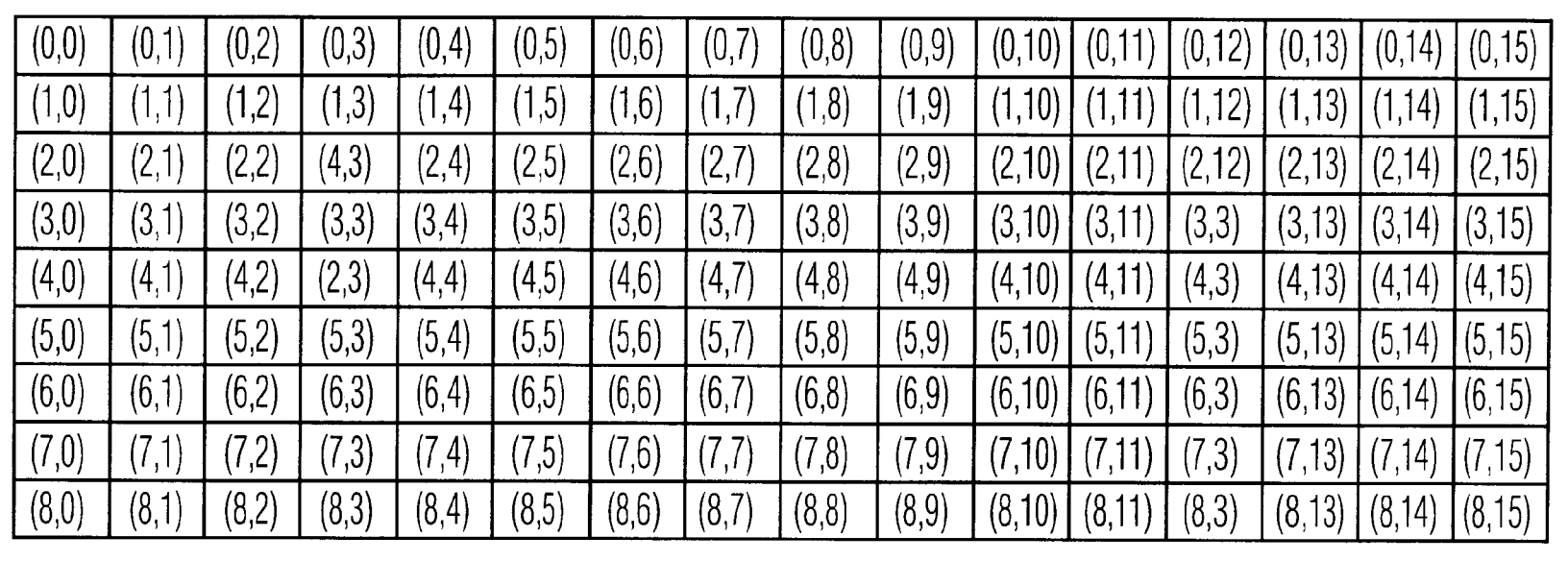

The data is written from register 18 into the memory elements (each comprising the discrete storage mechanism for binary code for each pixel location) in a random manner that follows a particular "decryption key" provided by the decrypter 25 of FIG. 4B such that the array of memory elements holds the decrypted pixel data as shown in FIG. 9. The data is then read out of the memory cells by read decoder 24 for display on the DMD in a structured manner. This method does not permit a signal to be generated outside of the display device that is "in the clear." The only point at which the pixel data is "in the clear" is at the display device itself.

Figure 6:
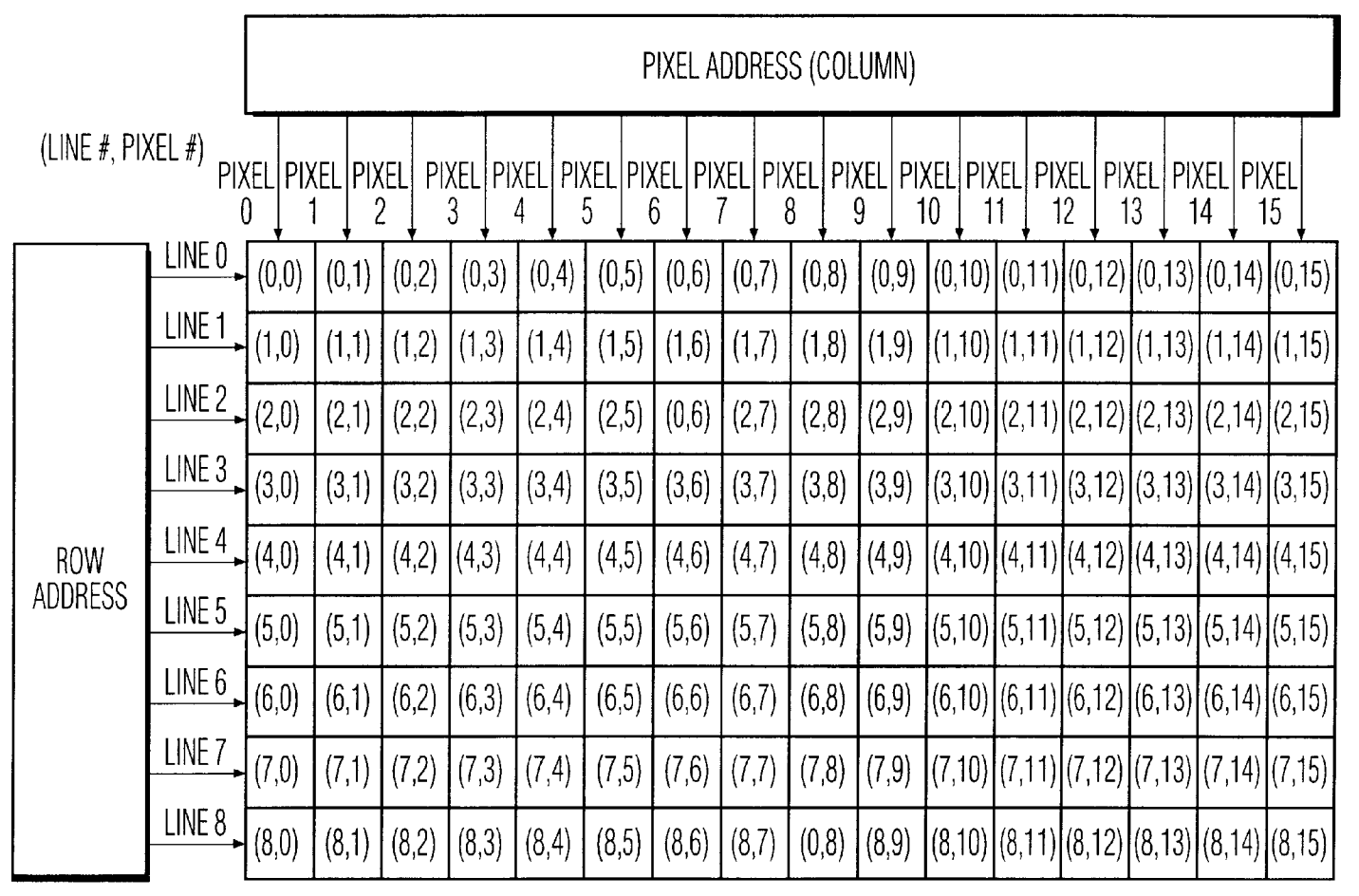

FIG. 6 shows a discrete display device with individual pixel cells. Each pixel is represented by a line number, 1, and a pixel number for that line, p. Any particular point on the display is referred to as (l,p). A line can also be referenced as a "row", and the position within the row (the pixel number) can also be called a "column". For example, a point at the extreme lower, right-hand portion of the display in FIG. 6 can be represented as (8,15) or (row 8, column 15). In this way, each point on the display has a corresponding coordinate, which can be mapped to a location in a memory array.

FIG. 7 shows a particular frame of data stored in the memory array for the DMD display. A table of pixel locations and corresponding pixel values can be created as shown in FIG. 11 which shows a tabulation of pixel values for lines (rows) 2 and 6.

In typical DMD systems the pixel data appearing in FIG. 7 is generated by the receiver in time-sequential order. For example, the order may follow the pixel locations, line-by-line, such as in a raster-scan system. This would mean that the pixel data would appear at the interface to the DMD "in the clear".

Figure 8:
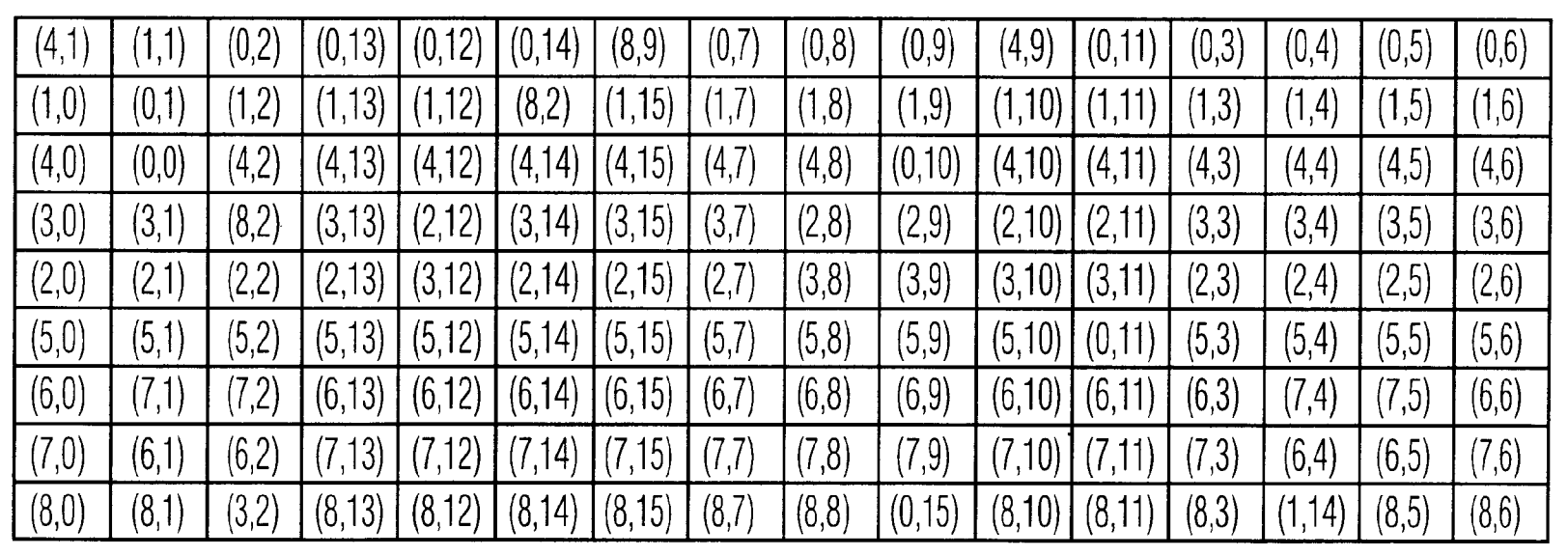

In accordance with the invention however, the pixel data appearing in FIG. 7 is not generated by the receiver in time-sequential order because the data are encrypted and the time order of the pixels as they are output from the video decoder are in an encrypted sequence. Although the encrypted sequence appears random it still follows some type of "key". This means that the time order of the data might follow a pattern which would create a "scrambled" image (as shown in FIG. 8) if the data were transferred to the array in a line-by-line order. As seen from FIG. 8 the pixel data would then be stored in the array of memory elements in apparently random locations. For example, the first pixel location is in actuality (0,0) (see FIG. 6), however, pixel (4,1) has been decoded for that location (see FIG. 8). If the key is known, however, the data can be decrypted when it is being loaded into the memory elements of the array 16 by decoder 22 and register 18 and then presented to the discrete display device for proper display. This can be achieved by loading the matrix array of memory elements in accordance with the decryption key rather than sequentially. Thus creating a matrix array of memory elements as shown in FIG. 9. The read operation is then performed by the decoder 24 in accordance with the known DMD read operation.

Thus in the preferred embodiment of the invention the loading of the array is altered such that pixel data are presented to the array of memory elements in a non time-sequential order. Such an operation requires that the timing generator 14 provide the appropriate control of the pixel column register 18 and the line (row) decoder 22 following the decryption key that corresponds to the pixel data. The writing of data into the pixel (column) registers is done one pixel at a time, followed by a transfer of that data into the appropriate line of the array 16 as instructed by the line (row) decoder 22 and the register 18. The loaded array appears as in FIG. 9. Once the entire array is loaded pixel-by-pixel rather than line-by-line, the read activation can occur in the standard, structured mode as described above under the control of the bit plane decoder 24.

Figure 10:
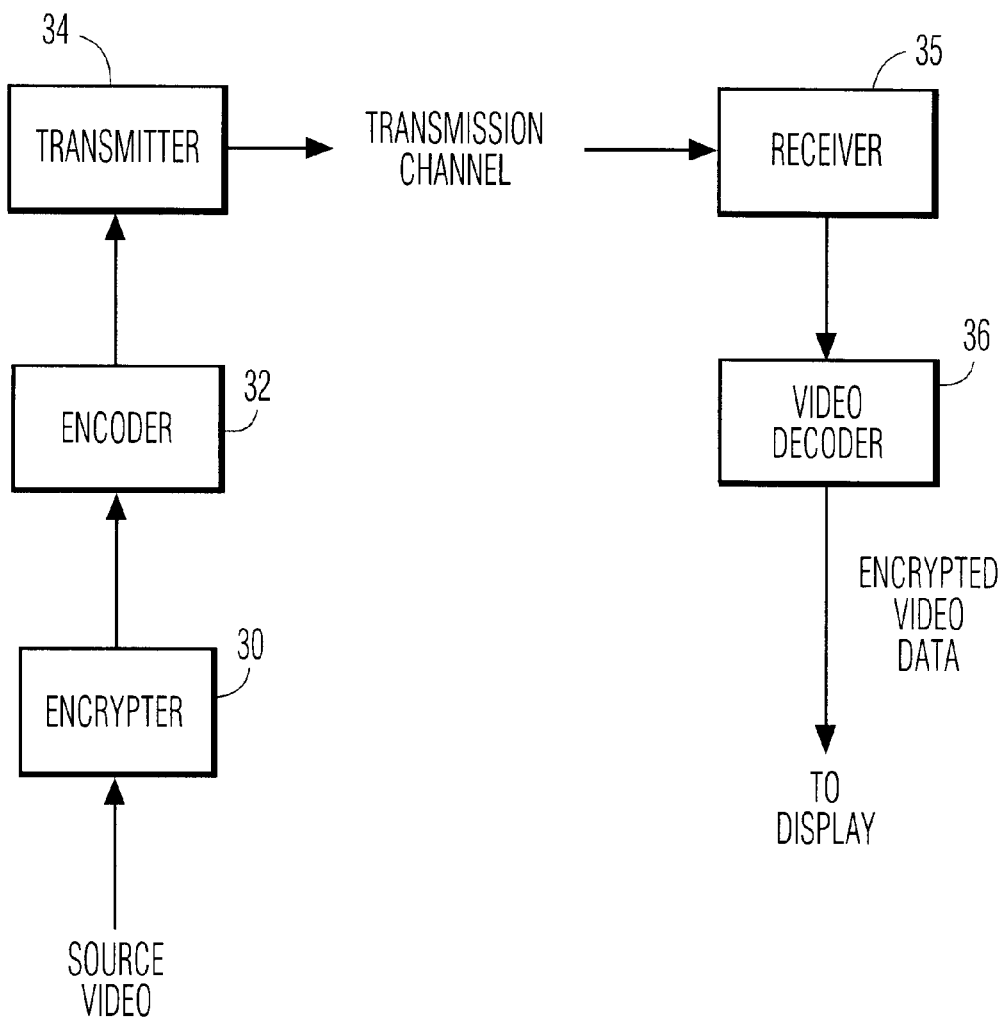
FIG. 10 shows the flow of video data in a television receiver in accordance with the invention.

FIG. 10 shows the flow of video data in a television receiver in accordance with the invention. The video is provided to a video encoder 30 for encoding and then to an encrypter 32. The encrypted and encoded video is then transmitted by transmitter 34 across the transmission channel to receiver 35. The receiver 35 supplies the encrypted and encoded video to video decoder 36. Although the video is decoded at video decoder 36, it is still in an encrypted form when it is supplied to the DMD display, thus avoiding a signal in the clear at the video output jacks.

Figure 12:
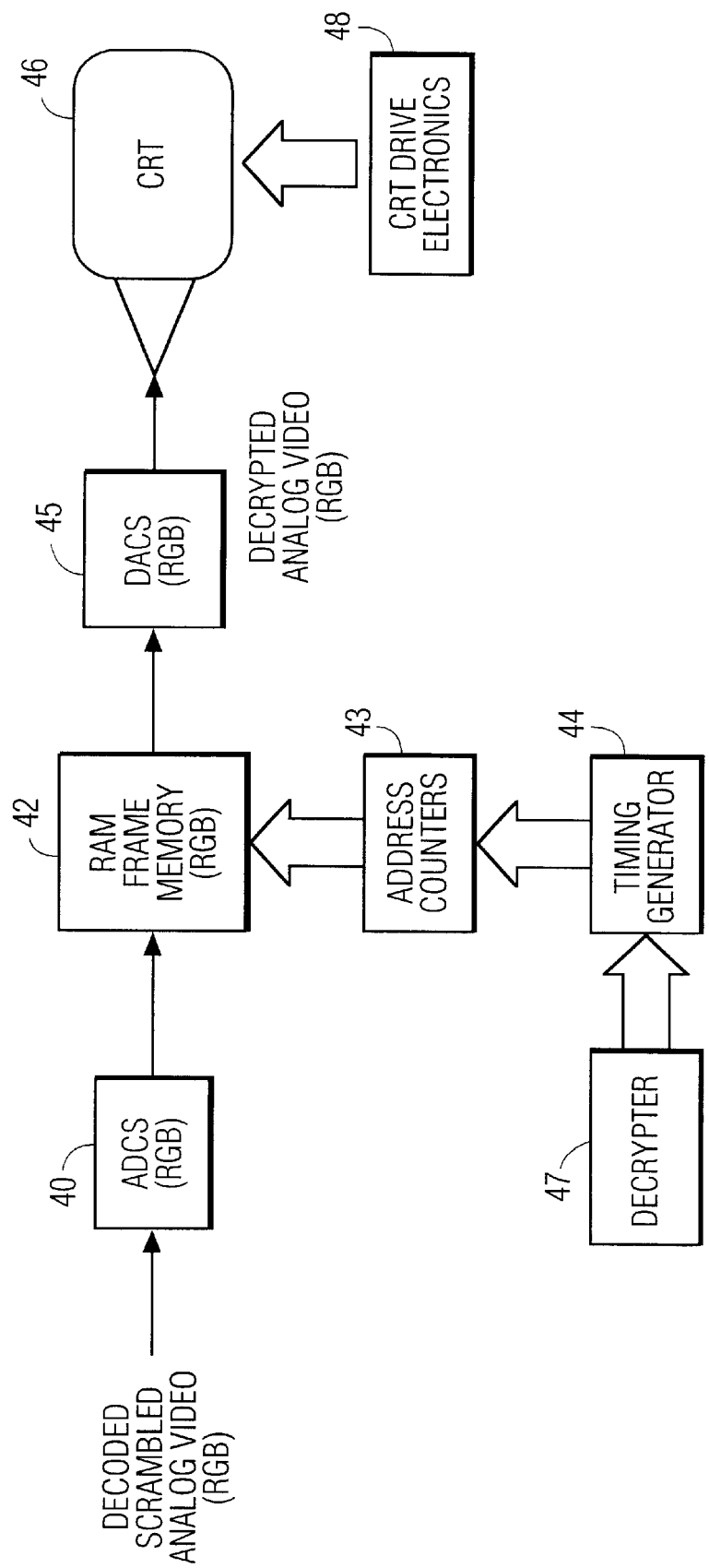
FIG. 12 shows an analog display device in accordance with the invention.

In an analog implementation of this invention a CRT is used to display a signal transmitted in an analog or digital fashion. FIG. 12 shows a CRT based system in accordance with the invention. Typically the scrambled video signals are descrambled before the CRT interface. In the present invention descrambling is performed as close to the CRT as possible. The decoded scrambled analog RGB video signals are converted to a digital format in the analog to digital converter 40. The digitized pixel data are then stored in a frame store (for interlaced video, a field store) which can be configured from a truly random access memory (RAM) 42. Thus any point in the memory can be addressed at any point in time. The addressing is provided by address counters 43. The address counters 43 are controlled by timing generator 44. This timing generate 44 has the intelligence to map the scrambled data into a known pattern as instructed by a decryption key from decrypter 47. The digitized pixel data is thus written into RAM 42 in a random sequence with the address counter 43 addressing the place in memory corresponding to the place required by the scrambled pixel value. On the "read" side of the RAM 42, the digitized pixel data is output in a sequential, pixel-by-pixel, line-by-line format. The descrambled digitized video pixel values are then read out of the RAM 42 in a raster-based order, converted to analog form by the digital to analog converter 45 and delivered to the CRT 46 in synchronism with the CRT drive electronic signals provided by the derive electronics 48.

The pixel data can be stored in RAM 32 in an encrypted order and read out in accordance with a decryption key, or written into the RAM 32 in accordance with the decryption key and read out in a sequential order. This invention is also applicable to analog displays which receive a digital signal and convert the digital signal into analog form for display.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

We claim:

1. A display device for decrypting and displaying encrypted video pixel data to thereby eliminate in-the-clear video signals, comprising:

an array of p columns and l rows of pixel cells for displaying the decrypted video pixel data as a frame;

a frame memory coupled to the array, the frame memory comprising an array of p columns and l rows of corresponding memory elements, each memory element being associated with a particular pixel cell and storing digital code of the decrypted video pixel data which represents the luminance of the particular pixel cell during a frame period;

a register coupled to an input of the frame memory for receiving and storing at least a portion of a frame of the digital code of the encrypted video pixel data in an encrypted order rather than in a column and row sequential order and for providing the video pixel data to the array of memory elements;

a write decoder coupled to the frame memory for activating the rows and columns of the memory elements for loading the frame memory with the stored digital code; and a decrypter coupled to the write decoder for supplying the decryption key to the write decoder such that the write decoder activates the rows and columns of the frame memory non-sequentially in accordance with the decryption key, wherein the decryption key ensures that the digital code of the encrypted video data stored in the register for each pixel cell is applied to the correct memory element thus decrypting the video pixel data without providing a frame of decrypted video pixel data before the memory elements are loaded.

2. The display device in accordance with claim 1, wherein the display device is a deformable mirror spatial light modulator.

3. The display device in accordance with claim 1, further including a timing device for providing timing pulses to the write decoder for activating the rows and columns of the array of memory elements.

4. The display device in accordance with claim 1, wherein the digital code itself is encrypted for each pixel cell and the decryption key decrypts the digital code before placing it in each memory element.

5. An analog display device for descrambling and displaying scrambled video signals without generating an in-the-clear video signal, comprising:

an input which receives scrambled analog RGB video signals, including:

an analog to digital converter for converting scrambled analog RGB video signals into encrypted digitized pixel data;

an array of p columns and l rows of pixel cells for displaying the descrambled video signals;

a frame memory comprising an array of corresponding p columns and l rows of memory elements, each memory element storing digitized pixel data of a pixel cell during a frame period, wherein the digitized pixel data is stored in the p×l memory elements in a substantially encrypted order such that $p_i n_j$ memory element does not necessarily hold the digitized pixel data of the $p_i n_j$ pixel cell but rather the digitized pixel data are stored in the array of memory elements in an encrypted order;

a decrypter for providing a decryption signal for decrypting the digitized pixel data from the array of memory elements by using a decryption key to match the digitized pixel data stored in each of the memory elements with its correct pixel cell;

a read decoder operatively coupled to the decrypter for receiving the decryption signal and for providing decrypted digitized pixel data in a pixel-by-pixel, line-by-line sequential order; and a digital to analog converter directly coupling the read decoder to the array for receiving and converting the decrypted digitized pixel data into an unscrambled analog video signal for display on the pixel cells without providing a frame of unscrambled analog video data or decrypted digitized pixel data outside of the housing of the display device before being applied to the pixel cells.

6. The analog display device in accordance with claim 5, wherein the analog display device further includes drive electronics for activating the pixel cells and wherein the unscrambled video signal is provided to the pixel cells in synchronism with the drive electronics.

7. The analog display device in accordance with claim 5, wherein the video signals are interlaced and the memory elements store the digitized pixel data during a field period.

8. A television receiver within a housing and including a display device for receiving, decrypting and displaying encrypted video pixel data without generating an in-the-clear video signal, the display device comprising:

an array of p columns by l rows of pixel cells for displaying the decrypted video pixel data as a frame;

a frame memory operatively coupled to the array comprising an array of p columns and l rows of corresponding memory elements, each memory element being associated with a particular pixel cell and storing digital code of the decrypted video pixel data which represents the luminance of the particular pixel cell during a frame period;

a register for storing at least a portion of a frame of the digital code of the encrypted video pixel data in an encrypted order rather than in a column and row sequential order and for providing the stored digital code to the array of memory elements;

a write decoder directly coupling the register to the frame memory for activating the rows and columns of the frame memory for loading the memory elements with the stored digital code; and a decrypter coupled to the write decoder for supplying a decryption key to the write decoder such that the write decoder activates the rows and columns of the frame memory non-sequentially in accordance with the decryption key, wherein the decryption key ensures that the digital code of the encrypted video data stored in the register for each pixel cell is applied to the correct memory element of the frame memory thus decrypting the video data without providing a frame of the decrypted video data outside of the housing of the television receiver before being applied to the array of pixel cells.

9. A television receiver within a housing and including an analog display device for descrambling and displaying scrambled video signals without generating an in-the-clear video signal, comprising:

an analog to digital converter for converting scrambled analog RGB video signals to encrypted digitized pixel data;

an array of p columns and l rows of pixel cells for displaying the descrambled video signals;

a frame memory comprising an array of corresponding p columns and l rows of memory elements, each memory element storing digitized pixel data of a pixel cell during a frame period, wherein the digitized pixel data is stored in the p×l memory elements in a substantially encrypted order such that a $p_i n_j$ memory element does not necessarily hold the digitized pixel data of the $p_i n_j$ pixel cell but rather the digitized pixel data are stored in the array of memory elements in an encrypted order;

a decrypter for providing a decryption signal for decrypting the digitized pixel data from the array of memory elements by using a decryption key to match the digitized pixel data stored in each of the memory elements with its correct pixel cell;

a read decoder operatively coupled to the frame memory for receiving the decryption signal and for providing decrypted digitized pixel data in a pixel-by-pixel, line-by-line sequential order; and a digital to analog converter directly coupling the array to the read decoder for receiving and converting the decrypted digitized pixel data into an unscrambled video signal for display on the pixel cells without providing a frame of the unscrambled video signal or the decrypted digitized pixel data outside of the housing before being read by the read decoder.

10. A method for decrypting and displaying encrypted video pixel data without generating an in-the-clear video signal, comprising:

receiving encrypted video pixel data including digital code for each pixel to be displayed decrypted on an array of p columns by l rows of pixel cells as a frame;

storing at least a portion of a frame of the digital code of the encrypted video pixel data in a register, such that the encrypted video data is stored in the register in an encrypted order rather than in a column or row sequential order;

providing the encrypted video pixel data to a frame memory having p columns and l rows of memory elements, each memory element being associated with a particular pixel cell to store the digital code of the decrypted video pixel data which represents the luminance of the particular pixel cell during a frame period; and using a decryption key to activate the rows and columns of the frame memory thereby loading the memory elements with the sorted digital code from the register, such that the rows and columns are activated non-sequentially in accordance with the decryption key, wherein the decryption key ensures that the digital code of the encrypted video data stored in the register for each pixel cell is applied to the correct memory element of the frame memory, thus decrypting the video data without providing a frame of the decrypted video data outside of the housing before the loading of the memory elements.

11. A method for descrambling and displaying scrambled video pixel data without generating an in-the-clear video signal, comprising:

receiving scrambled video data to be displayed descrambled on an array of p columns by l rows of pixel cells;

analog to digital converting the scrambled video data into encrypted digitized video data;

storing the encrypted digitized video data in a frame memory comprising corresponding p columns and l rows of memory elements, each memory element storing digital code representing the luminance of a pixel cell during a frame period, wherein the digital code is stored in the p×l memory elements in a substantially encrypted order such that a $p_i n_j$ memory element does not necessarily hold the digital code of the $p_i n_j$ pixel cell but rather the digital codes are stored in the array of memory elements in accordance with an encryption key;

reading and decrypting the digitized video data out of the frame memory by using a decryption key to match each of the digital codes stored in the memory elements of the frame memory with its correct pixel cell in a pixel-by-pixel, line-by-line sequential order decrypted digitized video data;

digital to analog converting the decrypted digitized video data into an unscrambled video signal; and applying the unscrambled video signal to the pixel cells without providing a frame of the decrypted digitized video data or the unscrambled video signal before reading the digital data from the memory elements.

12. An analog display device for descrambling and displaying scrambled video signals without generating an in-the-clear video signal, comprising:

a housing having an input which receives scrambled analog RGB video;

an analog to digital converter for converting the scrambled analog RGB video into encrypted digitized pixel data;

an array of p columns and l rows of pixel cells for displaying the descrambled video signals;

a frame memory comprising an array of p columns and l rows of memory elements, each memory element storing digitized pixel data of a pixel cell during a frame period;

an addresser for addressing the memory elements of the frame memory in accordance with a decryption key, such that the encrypted digitized pixel data is stored in the frame memory in a decrypted form; and a digital to analog converter directly coupling the addresser to the array of pixels and receiving and converting the decrypted digitized pixel data into an unscrambled analog video signal for display on the pixel cells without providing a frame of the unscrambled analog video signal or the decrypted digitized pixel data outside of the housing before being loaded into the memory elements.

13. A television receiver including an analog display device for descrambling and displaying scrambled video signals, the analog display device comprising:

an analog to digital converter for converting scrambled analog RGB video into encrypted digitized pixel data;

the analog display device comprising an array of p columns and l rows of pixel cells for displaying the descrambled video signals;

a frame memory comprising an array of p columns and l rows of memory elements, each memory element storing digitized pixel data of a pixel cell during a frame period;

an addresser for addressing the memory elements of the frame memory in accordance with a decryption key, such that the encrypted digitized pixel data is stored in the frame memory in a decrypted form; and a digital to analog converter for receiving and converting the decrypted digitized pixel data from the frame memory into an unscrambled analog video signal for display on the pixel cells of the analog display device without providing at least one of a frame of the unscrambled analog video signal and the decrypted digitized pixel data before being loaded into the memory element.

14. An analog display device for receiving encrypted video signals and decrypting, digital to analog converting and displaying the decrypted analog video signals comprising:

an array of p columns and l rows of pixel cells for displaying the decrypted analog video signals;

a frame memory comprising an array of p columns and l rows of memory elements, each memory element storing digitized pixel data of the encrypted video signals for a pixel cell during a frame period;

an addresser for addressing the memory elements in accordance with a decryption key, such that the encrypted digitized pixel data is stored in the frame memory in a decrypted form; and a digital to analog converter coupling the frame memory to the array for receiving and converting the decrypted digitized pixel data into an unscrambled analog video signal for display on the pixel cells of the array without providing at least one of the decrypted digitized pixel data and the unscrambled analog video signal before the loading of the memory elements.

* * * * *